H. B. WEAVER.
MOTOR OMNIBUS.
APPLICATION FILED OCT. 31, 1913. RENEWED FEB. 20, 1917.

1,241,795.

Patented Oct. 2, 1917.

WITNESSES

INVENTOR
Harold B. Weaver
BY
Seymour Seymour & McGrath
ATTORNEYS

UNITED STATES PATENT OFFICE.

HAROLD B. WEAVER, OF NEW YORK, N. Y., ASSIGNOR TO GAS-ELECTRIC MOTORBUS CORPORATION, A CORPORATION OF NEW YORK.

MOTOR-OMNIBUS.

1,241,795.

Specification of Letters Patent.

Patented Oct. 2, 1917.

Application filed October 31, 1913, Serial No. 798,435. Renewed February 20, 1917. Serial No. 149,940.

*To all whom it may concern:*

Be it known that I, HAROLD B. WEAVER, a citizen of the United States of America, and a resident of the city, county, and State of New York, have invented certain new and useful Improvements in Motor-Omnibuses, of which the following is a description.

My invention relates to improvements in double-deck or single deck stepless motor omnibuses, in which proportionably with the dimensions the seating capacity is the largest and the space occupied by the motor, the stairway and the accessories are the smallest, and access and exit from the car are most convenient. The objects of my improvement are 1st. To provide a low-step omnibus, the floor of which is the step, and without other steps in the car on the lower deck or on the upper deck.

2nd. To provide a single side entrance, commanded by the conductor, for both entrance and exit;

3rd. To locate the wheels within the contour of the car, so that the floor step may be in contact with the curb and on a level with it, without intervening space for missteps.

4th. To locate the driving mechanism in the lost space under the stairs in a manner not to encroach upon the seating capacity of the car;

5th. To provide a removable motor and truck, preferably direct connected, so that the car body may always be in service.

Other objects will appear from the description.

I attain these objects by the mechanism illustrated in the accompanying drawings forming part of this specification, in which Figure 1 is the upper deck plan of my improved car;

Similar letters refer to similar parts throughout the several views.

Figure 1:
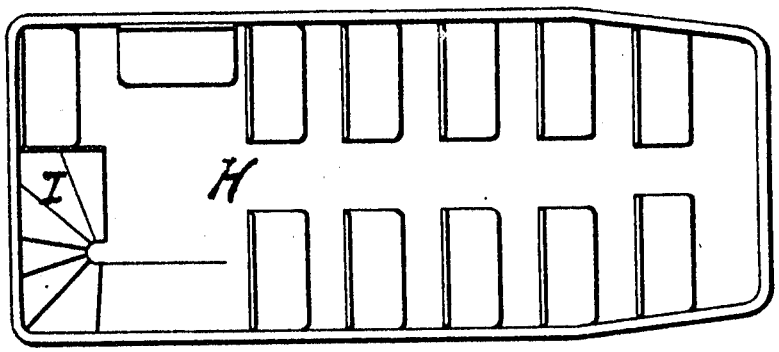
Figure 2:
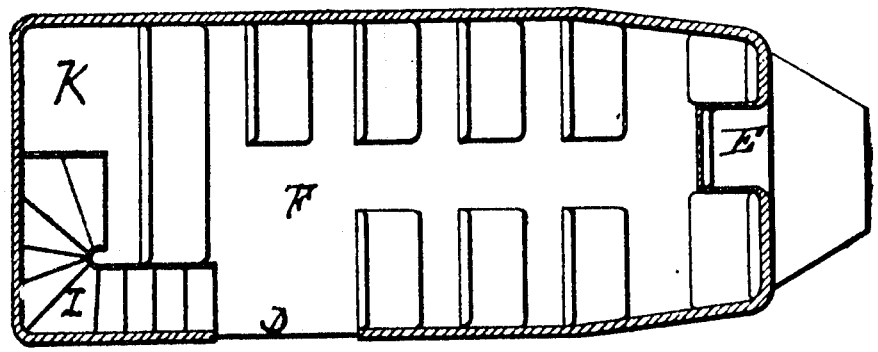
Fig. 2 is the lower deck plan.
Figure 3:
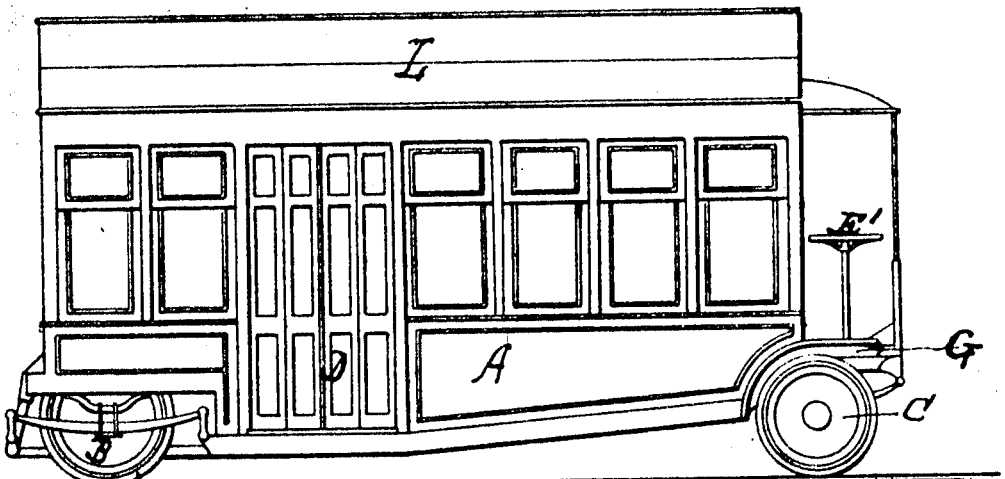
Fig. 3 is a side elevation of my improved car.

A is the car body;

B is a removable truck and motor, preferably direct connected;

C is the forward steering truck;

D the side door;

E the driver's seat, near which is located the steering mechanism, E', and the power control not shown, and which may be of any usual or convenient type.

F is the floor of the lower deck, which is also the low step, which may be on a level with the curb and in contact with the curb when the car is stopped.

G is the cutaway portion of the car body forward, to permit the steering wheels to be set within the contour line of the body of the car, and to permit floor contact at the edge of the floor with the curb.

H is the floor of the upper deck;

I are the stairs leading up and down to and from the upper deck;

K is the location of the oil tank or a part of the battery boxes, the remainder being located under the stairs on the lower deck, or, if preferred, a part of them may be located under the seats on the lower deck;

L is the parapet of the upper deck.

As I prefer the construction of my improved motor omnibus, it may have a length over all of 20 feet 11 inches, a width of 7 feet 6 inches, and a wheel base of 16 feet 5 inches, giving an inside length of 16 feet and 6 inches, with the lower deck at the door about 8 inches from the street surface, rising gradually toward the front.

The one door of the car is on the right-hand side looking forward, and a clear space on the lower deck inside is provided by omitting one seat on the door side of the car, in which is stationed the conductor, having command of the aisle on the lower-deck and the stairs, past whom all passengers must move in entering the car and passing to a seat, and who is conveniently located for collecting fares as passengers enter, freed from the necessity of moving through the car or to the upper deck.

The forward truck is let into the body of the car, and may be flush with the side; and the motor truck in the rear, with its outside spring, is also preferably within the contour of the car, so that the car may be lined up to the curb, with the floor in contact with the curb and on the same level.

Such being the construction of my improved motor omnibus, the operation is apparent. The lost room under the stairs is utilized for the motor and batteries; the motor truck is removable, so that the car body may be in constant use, there is no available space not utilized for seating, and the passenger capacity of the car, in proportion to its dimensions, is greater than any other. The low floor and stepless feature have never before been obtained in motor omnibuses without sacrifice of seating capacity; and the length, in proportion to capacity, enables the omnibus to make sharp turns without danger of accident.

I have specified by way of example only, and not as a limitation, the preferred form, but changes may be made without departing from the spirit of my invention.

What I claim as new and desire to secure by Letters Patent is—

1. A double-deck, stepless motor omnibus, having both decks of a continuous floor, the lower deck hung low, a stairway to the upper deck, and a prime mover and a driving axle and wheels under the stairway.

2. A double-deck, stepless motor omnibus, having both decks of a continuous floor, the lower deck hung low, a stairway to the upper deck, a side door adjacent to the stairway, a recess for the power unit underneath the stairway, and a removable power unit comprising the axle and driving wheels in said recess.

3. A double-deck, stepless omnibus, having a car body hung low, without entrance steps or chassis, a stairway to the upper deck, a removable prime mover and driving axle and wheels under the stairway, and a steering truck in front.

4. A stepless motor omnibus, having the floor hung low, without entrance steps or chassis, a removable prime mover and driving axle and wheels, and a steering truck in front.

5. A stepless motor omnibus, having the floor hung low, without entrance steps within the car or at the entrance, a side door, wheels within the contour of the car, a prime mover and a driving axle and wheels, and a steering truck in front.

6. A stepless motor omnibus having the floor hung low, without entrance steps within the car or at the entrance, a driving axle and driving wheels, and a steering truck in front, all the wheels being within the contour of the car.

7. In a stepless omnibus, the combination with a car having a low hung floor, of a supporting truck for one end having wheels within the contour of the car, and a removable unit comprising a prime mover and driving wheels for supporting the other end of the omnibus.

8. In a motor omnibus, the combination with a low hung floor having no entrance steps within the car or at the entrance, of a side door entrance, wheels within the contour of the car to permit close approach of the entrance to the curb, and means for driving certain of said wheels.

9. In a motor omnibus, the combination with a low hung floor having no entrance steps within the car or at the entrance, of a side door entrance, wheels within the contour of the car to permit close approach of the entrance to the curb, means for driving certain of said wheels, an upper deck, and a stairway thereto within the car.

In witness whereof I have hereunto set my hand at the city, county and State of New York, this 28th day of October, 1913.

HAROLD B. WEAVER.

In presence of—
JOB J. RANAGAN,
FRANK EUFEMIA.